US008326825B2

(12) United States Patent
Nehme et al.

(10) Patent No.: US 8,326,825 B2
(45) Date of Patent: Dec. 4, 2012

(54) AUTOMATED PARTITIONING IN PARALLEL DATABASE SYSTEMS

(75) Inventors: Rimma Vladimirovna Nehme, Madison, WA (US); Nicolas Bruno, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 12/940,440

(22) Filed: Nov. 5, 2010

(65) Prior Publication Data
US 2012/0117065 A1    May 10, 2012

(51) Int. Cl.
*G06F 17/30* (2006.01)
(52) U.S. Cl. .................................................. 707/719
(58) Field of Classification Search ............. 707/2, 737, 707/719; 709/223
See application file for complete search history.

(56) References Cited

U.S. PATENT DOCUMENTS

| | | | |
|---|---|---|---|
| 5,544,355 | A | 8/1996 | Chaudhuri et al. |
| 6,236,985 | B1 | 5/2001 | Aggarwal et al. |
| 6,289,354 | B1 | 9/2001 | Aggarwal et al. |
| 7,512,600 | B2 | 3/2009 | Al-Omari et al. |
| 2001/0033693 | A1 | 10/2001 | Seol et al. |
| 2006/0259442 | A1 | 11/2006 | Iqbal |
| 2006/0277090 | A1 | 12/2006 | Bollenbeck et al. |
| 2009/0063396 | A1* | 3/2009 | Gangarapu et al. ............... 707/2 |
| 2009/0327254 | A1 | 12/2009 | Bruno et al. |
| 2010/0042963 | A1 | 2/2010 | Bruno et al. |

OTHER PUBLICATIONS

P. Griffiths Selinger et.al, Access Path Selection in a Relational Database Management System, Pub. Date: 1979, pp. 23-34.
A. Hameurlain et.al, A Cost Evaluator for Parallel Database Systems, Pub. Date: 1995, (11 pages).
Chun-Hung Cheng et.al, A Genetic Algorithm-Based Clustering Approach for Database Partitioning, Pub. Date: Aug. 2002, (pp. 215-230).
Surajit Chaudhuri et.al, An Efficient, Cost-Driven Index Selection Tool for Microsoft SQL Server, Pub. Date: 1997, (10 pages).
Aster Data, Aug. 18, 2010 (Retrieved Date), http://www.asterdata.com/, (1 page).
Surajit Chaudhuri et.al, Auto-Admin What-If Index Analysis Utility, Pub. Date: 1998, (pp. 367-378).
Sanjay Agrawal et.al, Automated Selection of Materialized Views and Indexes for SQL Databases, Pub. Date: 2000, (10 pages).
Jun Rao et.al, Automating Physical Database Design in a Parallel Database, Pub. Date: 2002, (12 pages).
Walter H. Kohler et.al, Characterization and Theoretical Comparison of Branch-and-Bound Algorithms for Permutation Problems, Pub. Date: 1974, (17 pages).

(Continued)

*Primary Examiner* — Etienne Leroux
(74) *Attorney, Agent, or Firm* — Workman Nydegger (57) ABSTRACT

Embodiments are directed to determining optimal partition configurations for distributed database data and to implementing parallel query optimization memo data structure to improve partition configuration cost estimation efficiency. In an embodiment, a computer system accesses a portion of database data and various database queries for a given database. The computer system determines, based on the accessed database data and database queries, a partition configuration search space which includes multiple feasible partition configurations for the database data and a workload of queries expected to be executed on that data. The computer system performs a branch and bound search in the partition configuration search space to determine which data partitioning path has the lowest partitioning cost. The branch and bound search is performed according to branch and bound search policies. The computer system also outputs the partition configuration with the determined lowest partitioning cost.

21 Claims, 5 Drawing Sheets

OTHER PUBLICATIONS

Nicolas Bruno et. al, Configuration-Parametric Query Optimization for Physical Design Tuning, Pub. Date: 2008, (12 pages).
Daniel C. Zilio et.al, DB2 Design Advisor—Integrated Automatic Physical Database Design, Pub. Date: 2004, (pp. 1087-1097).
Gao Cong et.al, Distributed Query Evaluation With Performance Guarantees, Pub. Date: 2007, (pp. 509-520).
Michael Isard et.al, Dryad—Distributed Data-Parallel Programs from Sequential Building Blocks, Pub. Date: 2007, (14 pages).
Stratos Papadomanolakis et.al, Efficient Use of the Query Optimizer for Automated Physical Design, Pub. Date: 2007, (12 pages).
Green Plum, Aug. 18, 2010 (Retrieved Date), (1 page).
Azza Abouzeid et.al, HadoopDB—An Architectural Hybrid of Map-Reduce and DBMS Technologies for Analytical Workloads, Pub. Date: 2009, (12 pages).
Sahram Ghandeharizadeh et.al, Hybrid-Range Partitioning Strategy—A New Declustering Strategy for Multiprocessor Database Machines, Pub. Date: 1990, (pp. 481-492).
Sanjay Agrawal et.al, Integrating Vertical and Horizontal Partitioning into Automated Physical Database Design, Pub. Date: 2004, (pp. 359-370).
Michael Stonebraker et.al, Map-Reduce and Parallel DBMSs—Friends or Foes, Pub. Date: 2010, (pp. 64-71).
Hung-chih Yang et.al, Map-Reduce-Merge—Simplified Relational Data Processing on Large Clusters, Pub. Date: 2007, (pp. 1029-1040).
Thomas Stöhr et.al, Multi-Dimensional Database Allocation for Parallel Data Warehouses, Pub. Date: 2000, (pp. 273-284).
Netezza, Aug. 18, 2010 (Retrieved Date), (1 page).
David J. DeWitt et.al, Parallel Database Systems—the Future of High Performance Database Systems, Pub. Date: 1992, (pp. 1-26).
Daniel C. Zilio, Physical Database Design Decision Algorithms and Concurrent Reorganization for Parallel Database Systems, Pub. Date: 1997, (295 pages).
Carlo Curino et.al, Schism—A Workload Driven Approach to Database Replication and Partitioning, Pub. Date: 2010, (10 pages).
Ronnie Chaiken et.al, Scope—Easy and Efficient Parallel Processing of Massive Data Sets, Pub. Date: 2008, (12 pages).
SQL Server 2008 R2 Parallel Data Warehouse, Aug. 18, 2010 (Retrieved Date), (3 pages).
Goetz Graefe, The Cascades Framework for Query Optimization, Pub. Date: 1995, (pp. 19-28).
The Vertica Analytic Database Technical Overview White Paper, Pub. Date: 2008, (13 pages).
Goetz Graefe et.al, The Volcano Optimizer Generator—Extensibility and Efficient Search, Pub. Date: 1993, (20 pages).
Kiran J. Achyutuni et.al, Two Techniques for On-Line Index Modification in Shared Nothing Parallel Databases, Pub. Date: 1996, (pp. 1-26).

* cited by examiner

AUTOMATED PARTITIONING IN PARALLEL DATABASE SYSTEMS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. In some cases, software application may be used to simulate the results of an action or implementation. For example, in database systems, query optimizers may be used against a simulated distributed database as if it were a regular (single-site) database. The simulation may allow a user to see how the queries would run against the database as if it were a distributed system. Parallel query optimizers may be used to process queries in the "what-if" mode to determine how the queries may be executed on a distributed system. Such "what-if" optimizations are often very time-intensive and tend to consume large amounts of computer resources.

BRIEF SUMMARY

Embodiments described herein are directed to determining optimal partition configurations for distributed database data and to implementing parallel query optimization memo data structure to improve partition configuration cost determination efficiency. In one embodiment, a computer system accesses a portion of database data and various database queries for a given database. The computer system determines, based on the accessed database data and database queries, a partition configuration search space which includes multiple feasible partition configurations for the database data and a given workload of queries. The computer system performs a branch and bound search in the partition configuration search space to determine which data partitioning configuration has the lowest determined cost. The branch and bound search is performed according to branch and bound search policies. The computer system also outputs the partition configuration with the lowest determined cost.

In another embodiment, a computer system accesses a portion of database data, database queries for a given database and retrieves memo data structures that represent the search space for each query for efficient what-if scenario computations. The computer system determines, based on the accessed database data, the database queries and the memo data structures, a partition configuration search space which includes multiple feasible partition configurations for the database data. The computer system performs a branch and bound search in the partition configuration search space to determine which data partitioning path has the lowest partitioning cost. The branch and bound search is performed according to branch and bound search policies. The memo data structures are used to avoid computing lengthy and resource-intensive what-if optimization computations from scratch for every partition configuration from the enumerated search space. The computer system also outputs the partition configuration with the lowest determined cost.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to determining optimal partition configurations for distributed database data and to implementing parallel query optimization memo data structure to improve partition configuration cost determination efficiency. In one embodiment, a computer system accesses a portion of database data and various database queries for a given database. The computer system determines, based on the accessed database data and database queries, a partition configuration search space which includes multiple feasible partition configurations for the database data and a given workload of queries. The computer system performs a branch and bound search in the partition configuration search space to determine which data partition configuration has the lowest determined cost. The branch and bound search is performed according to the branch and bound search policies. The computer system also outputs the partition configuration with the lowest determined cost.

In another embodiment, a computer system accesses a portion of database data using database queries and generates memo data structures that include what-if scenario computations for the given workload of queries. The computer system determines, based on the memo data structures, a partition configuration search space which includes multiple feasible partition configurations for the given database data and queries. The computer system performs a branch and bound search in the partition configuration search space to determine which data partition configuration has the lowest determined cost. The branch and bound search is performed according to branch and bound search policies. The branch and bound search uses the memo data structures to avoid re-computing already calculated what-if optimization scenario computations. The computer system also outputs the partition configuration with the determined lowest cost.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
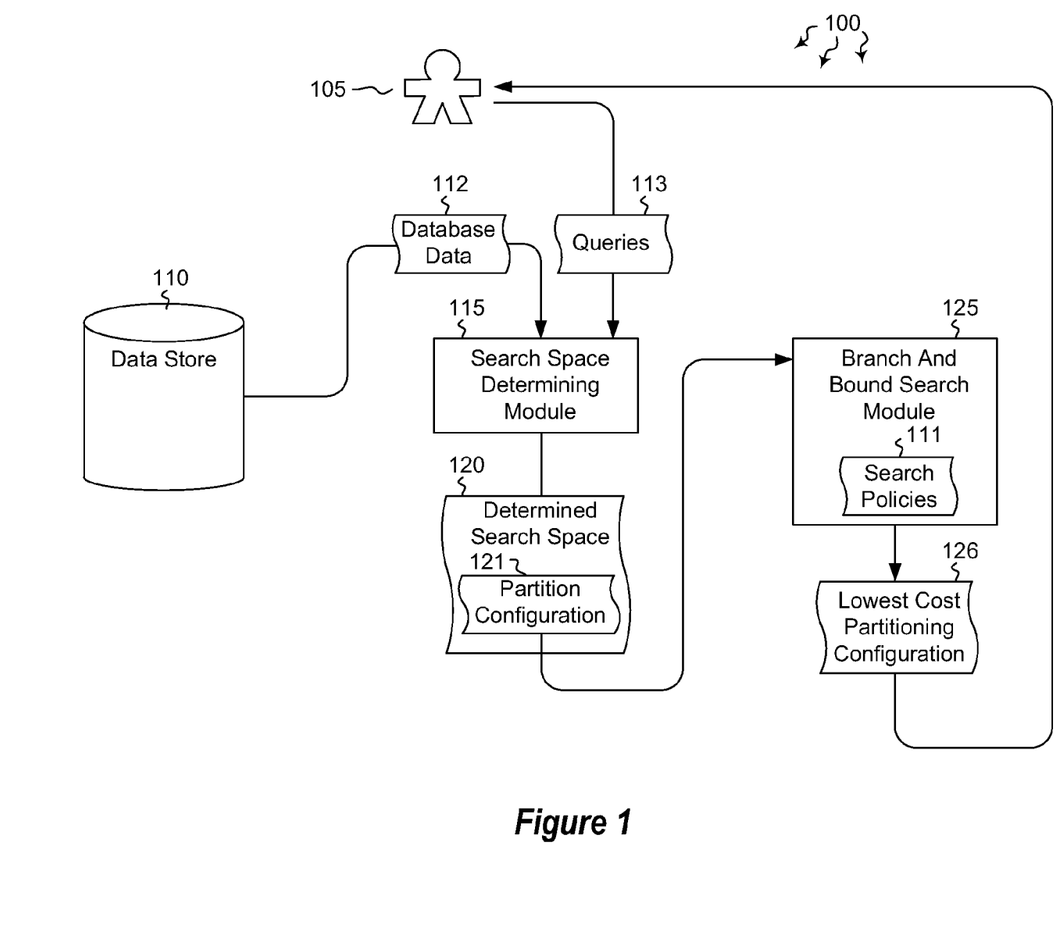
FIG. 1 illustrates a computer architecture in which embodiments of the present invention may operate including determining optimal partition configurations for distributed database data and workload of queries.

FIG. 1 illustrates a computer architecture 100 in which the principles of the present invention may be employed. Computer architecture 100 includes search space determining module 115. The search space determining module may be configured to determine a search space for a given portion of database data 112 and queries 113 from a user 105 or other software application or computer system. As used herein, a search space refers to a set of possible partitioning options or configurations that are possible for a given portion of data and a given set of data queries. In response to the queries 113, various data partitioning options may be available. Due to the various configurations' size or other constraints, some configurations may be more desirable than others. Accordingly, the branch and bound search module 125 may be used to determine which of the partition configurations 121 is the best. In some cases, the lowest cost partition configuration 126 is the best.

The branch and bound search module 125 may be configured to perform a branch and bound search in the search space 120 determined by search space determining module 115. The branch and bound search module may take into consideration various search policies 111 that may specify size, time, processing or other constraints by which the search is to be performed. Data store 110 may be configured to store database data 112 and other portions of data. Data store 110 may be any type of data storage system including a standalone device or a distributed system spread over multiple computer systems or storage devices.

The user 105 may be any type of computer user including an end-user, administrator, IT professional or other type of user. The queries may be any type of database or other information queries requesting information stored in a database or other similar storage system. Databases queried by queries 113 may have tables or other data structures which may be partitioned or replicated at any given row or column. A partition configuration, as used herein, may indicate a scenario where a given database table is partitioned along a given column or row. As each partition configuration is different, each may be evaluated and ranked as to its desirability or usability. These concepts will be explained in greater detail below.

In some embodiments, the database to be queried includes a parallel query optimizer. Such an optimizer may be implemented to perform "what-if" optimizations by simulating the parallel execution in a distributed database on a regular database. Such parallel query optimizers may be accessed and used to provide accurate cost estimation assuming a particular partition configuration is actually physically instantiated in the distributed system. In some cases, a search algorithm may be implemented that leverages the optimizer's internal memo data structure to perform what-if optimization calls in a much more efficient manner.

Figure 5:
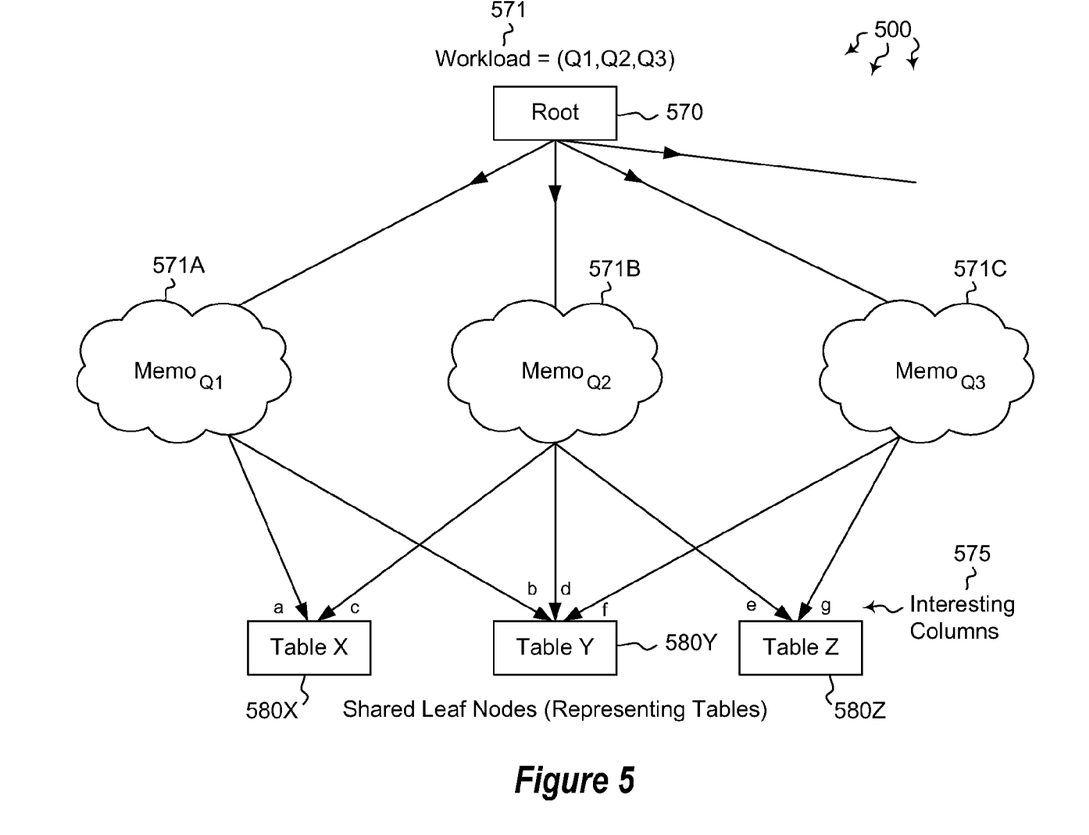
FIG. 5 illustrates an embodiment in which workload search space using memo data structures are depicted for determining optimal partition configurations and speeding up the partition configuration cost determination.

The memo data structure may provide a compact representation of the search space 120 of all possible execution paths for a given query. Several memo data structures may be extended to create what is referred to herein as a "workload memo data structure". Environment 500 of FIG. 5 illustrates the workload memo data structure for three queries (Q1, Q2 and Q3) (571). The workload memo may include the union of individual memos for the queries in the workload (Q1-Q3). To form a workload memo, the following steps may be executed: (1) obtain an individual memo for each query in the workload (e.g. 571A, 571B and 571C), (2) attach a global root node (e.g. 570) with the outgoing edges to each individual memo, and (3) merge the leaf nodes which represent the various access paths to tables in the database (e.g. tables 580X, 580Y and 580Z). After the merge, distinct leaf nodes may be obtained (in some cases, one per table) that are shared by the individual memos in the workload memo (Tables X, Y and Z (580X, 580Y and 580Z, respectively)).

The algorithm used to re-optimize a query under an arbitrary partition configuration may be similar to the parallel post-optimization process. Partition configurations (along with their required partitioning properties) may be identified in a top-down fashion starting with the root group. Query costs under a partition configuration may, in turn, be computed in a bottom-up fashion. Partition properties of a node may depend on the node's parent (e.g., a hash-join node may induce partitioning on the join columns to each of its children). If a node does not satisfy its required properties, a data movement operator (e.g., a shuffle or replicate operator) may be added to the query plan in order to satisfy the required properties and produce correct query results.

The cost of a node in memo data structure may depend on its type. If it corresponds to a leaf node, the current partitioning of the underlying base table may be identified and the cost of the operation may be estimated with respect to the current partitioning. If the node is an internal node, the required partitioning properties may be derived for the children nodes and the best (lowest) cost may be derived by adding to the local cost of the operator plus the sum of the best (lowest) costs of each of its children (calculated recursively). Among all potential operations in a group, the one that satisfies the required properties and has the lowest cost may be selected.

By leveraging the memo data structure, the optimization of the workload may be simulated under arbitrary configurations by repeating the parallel post-processing step and adjusting the initial partition configuration for the memo leaf nodes. Additional properties may be inferred, as described below.

"Interesting columns" in the parallel query optimizer, as referred to herein and as shown in FIG. 5 (575), may represent an extension of the notion of interesting orders (e.g., a sub-configuration that returns results partitioned in a certain way may be preferable to a cheaper alternative, because later in the query optimization process the partitioning scheme may be leveraged to obtain a globally optimum solution). In some cases, the parallel query optimizer may consider the following partitioning columns to be interesting: (a) columns referenced in equality join predicates, and (b) any subset of group-by columns. Join columns may be interesting columns because they make local and directed joins possible, thus requiring no or limited data movements. Group by columns may be interesting, because aggregations can be done locally at each node and then combined. In some embodiments, only columns deemed as interesting columns are considered as partitioning candidates. Other columns that would not be useful as partitioning columns by any operator in the memo may be safely omitted from consideration.

In some embodiments, "star-partitioning" or "*-partitioning" may be used in the memo-based search algorithm for the best partition configuration. Such *-partitioning indicates that every partition (or replication) for a base table is simultaneously available. If a table is *-partitioned, the parallel optimizer can pick the concrete partitioning scheme that is best suited for every given partitioning request (e.g., one that does not require moving data around) during parallelization post-processing of a query in the workload. If the table size is below a storage bound, the optimizer can also consider replication. In this way, the optimizer simultaneously considers all possible partitioning alternatives for *-partitioned tables during a single post-processing step, and returns the execution plans (partition configurations) with the lowest overall cost (e.g. 126).

In some cases, not all resulting plans may be valid when using *-partitioned tables. Specifically, if the same table delivers different concrete partitioning columns for the final execution plans of the queries in the workload, the resulting configuration may not be valid as each table can be partitioned in a single way. However, this mechanism enables the optimizer to select the best concrete partition for a *-partitioned table, and thus obtain lower bounds on the cost of configurations that are partially specified (i.e., configurations that include some *-partitioned tables), and do so without issuing additional optimization calls.

Branch and bound searches may be used to deal with large search spaces. The branch and bound search is based on the observation that the enumeration of partition solutions has a tree structure, and avoids growing the whole tree as much as possible. Instead, the branch and bound search grows trees in stages, and (at least in some cases) grows only the most promising nodes at any stage. Branch and bound search module 125 may determine which node is the most promising by estimating a bound on the best value of an objective function that may be obtained by growing that node to later stages. Pruning may also be used in branch and bound searches, which may discard whole subtrees when a node or any of its descendants is determined not to be either feasible or optimal. Pruning prevents the search tree from growing more than necessary.

When discussing branch and bound searching, it should be kept in mind that a node, as used herein, may refer to any partial (e.g. 450) or complete (e.g. 460) partitioning solution. A node may associate each table with either a concrete partitioning strategy, a replication, or a *-partitioning option. A leaf node (457), as used herein, may refer to a complete solution in which no table is *-partitioned (e.g., S3 (462C) in FIG. 4). A bud node (456), as used herein, may refer to a partial solution with some *-partitioned tables (e.g. nodes 461A-C). A bud node might grow further by replacing a *-partitioned table with either a concrete partitioning or replication (e.g., S1 (462A) and S2 (462B) in FIG. 4). A bounding function, as used herein, may refer to a lower bound on the cost of the workload under a given (partially specified) configuration. If the configuration is fully specified (i.e., without *-partitioned tables), the bounding function may comprise the expected cost of the workload under such partition configuration. Furthermore, as used herein, an incumbent may refer to the best fully specified partitioning solution (e.g. 460) satisfying the space constraint (and/or other constraints) found at a given point during the execution of the search algorithm.

Figure 4:
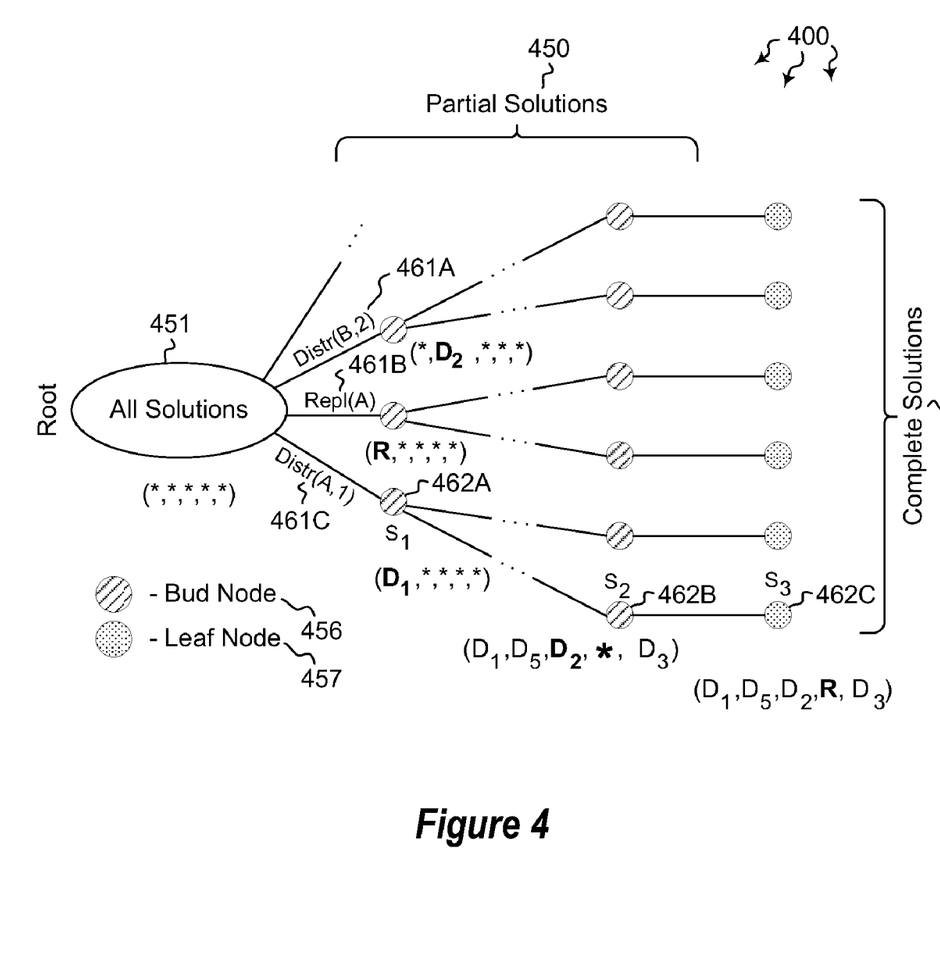
FIG. 4 illustrates an embodiment depicting branch and bound search for optimal partition configuration in which partial and complete partitioning solutions are presented.

FIG. 4 illustrates an example of an enumeration tree for a partitioning design scenario. The root of the tree labeled "all solutions" 451 consists of all *-partitioned tables. Leaf nodes 457 represent fully specified partition configurations with associated costs. A bud node 456, (e.g. S1) represents a partial solution 450, where the first table is partitioned on the first column (in the table's schema) and the rest of the tables are *-partitioned.

In some cases, a node selection policy may be implemented. The node selection policy may govern how to choose the next bud node for expansion. Using the node selection policy, at each iteration, the last node that was expanded may be selected. When a leaf node is reached, the policy says to backtrack to the earliest ancestor that is not fully explored and continue from there. One property of this policy is that the first incumbent is reached quickly, which in turn enables more aggressive pruning of subsequent portions of the search space, and speeds up the overall search.

In some cases, a backtracking policy may be implemented in combination with a branch and bound policy. For instance, a branch and bound policy may include a node selection policy that governs how to choose subsequent nodes for expansion and includes the a backtracking policy that governs where in the branch and bound tree the search is to move when a leaf node is reached or a subtree is pruned. The node selection policy may include selecting, at each iteration, the last node that was expanded and may continue its expansion. The backtracking policy may include navigating the search to either the earliest ancestor node that has not been fully traversed, or to the best (smallest cost-wise) bud node in the branch and bound tree that has not yet been fully explored (or some other deciding heuristic), and begin traversing on that determined earliest ancestor or lowest cost node. The backtracking policy may include many different types of backtracking policies including depth-first search, breadth-first search, global minimum, or other types.

In some cases, a table/column selection policy may be implemented. The table/column selection policy may indicate that once a bud node 456 has been chosen for expansion, a *-partitioned table is to be chosen to instantiate. Moreover, the policy indicates that a partitioning method is to be selected or that the table is to be replicated. In line with this policy, all interesting columns are ranked in order. The ranking of a column C may be the total cost of all queries that have C as an interesting column. It should be noted that, before trying any partitioning on a table, the system may attempt to replicate the table (for small tables it is often optimal to use replication, as large tables may fail corresponding storage constraints and, in such cases, configuration would not be searched further).

A pruning strategy may be implemented to prune bud nodes. Bud nodes may be pruned when no descendent nodes are feasible. In some cases, if the total space used for replication exceeds the corresponding storage constraint, it may be determined that no descendant of the current bud node would fit either, and we can prune that subtree. In another case, it may be determined that no descendant will be optimal. If the bounding function of the current bud node is worse than the objective function of the incumbent, we know that no feasible solution that is a descendant of the current bud would be optimal, and that subtree can be pruned from the search.

In some cases, bud nodes may be promoted. Star-partitioning may not only return a lower bound on the cost of a partially specified configuration, but in some cases may fully specify the optimal configuration as well. Specifically, if every table in the database delivers a unique partitioning column for all execution plans in the workload, then this is the optimal configuration that would be eventually found by the branch and bound technique after instantiating all the remaining *-partitioned tables. In such cases, it is not necessary to actually conduct the search. Instead, the bud node B can be replaced with the corresponding leaf node that is optimal when varying all of B's *-partitioned tables, and, in effect, fully prune the corresponding subtree.

A stopping policy may be implemented which stops the search and returns the incumbent in case it is not possible to exhaustively enumerate the whole search space. This stopping policy may be time-based, iteration-based, or based on other factors such as no improvement in the best partition configuration (i.e., the incumbent) has been obtained over a certain period of time.

In some embodiments, a memo-based search algorithm may be implemented as follows: initially, the workload memo is created and the current incumbent is set as null. Next, the branch and bound tree root is created, which contains all *-partitioned tables. Until the stop condition is met, the following steps are performed: select the next promising configuration based on the node selection policy, pick a *-partitioned table and create a child configuration by either replicating or partitioning such table based on the table selection policy, if the resulting configuration does not fit in the storage bound, it is pruned. Pruning would occur because after the storage bound has been exceeded, the remaining *-partitions would be subsequently resolved into replication, adding more space still, or partitioning, which would not change the space consumed by the replicated tables in the current partition configuration thus keeping the configuration invalid.

If the configuration otherwise satisfies the storage bound, parallel post-processing of the memo may be performed with respect to the new partition configuration. If the configuration is in a leaf node (or a node which can be promoted to one), it is fully specified, and the value of the cost represents the actual cost of evaluating the workload under such configuration. In this case, if the cost of the new configuration is smaller than that of the incumbent, the incumbent can be made equal to the new configuration (note that cost of an incumbent which is set to null is infinity). The new configuration may be pruned in case it was promoted from a bud, since the optimal configuration was previously inferred and, thus, not need to be explored further from that point.

If, instead, the configuration is partially specified (e.g. 450), the value of cost represents a lower bound on the cost of any configuration derived from the configuration stored in that node. If cost is worse than that of the incumbent, the new configuration is pruned, because no solution derived from it would be better than the current incumbent. When the stopping condition is met, the current incumbent solution is returned, which satisfies the storage constraint with minimum cost among the explored partition configuration solutions. In such cases, the by-product of the memo analysis and the *-partitioning scheme provides the capability to compute a lower bound on the costs of partial configurations that allow pruning of many alternatives without loss in quality of the resulting partitioning recommendations.

Figure 2:
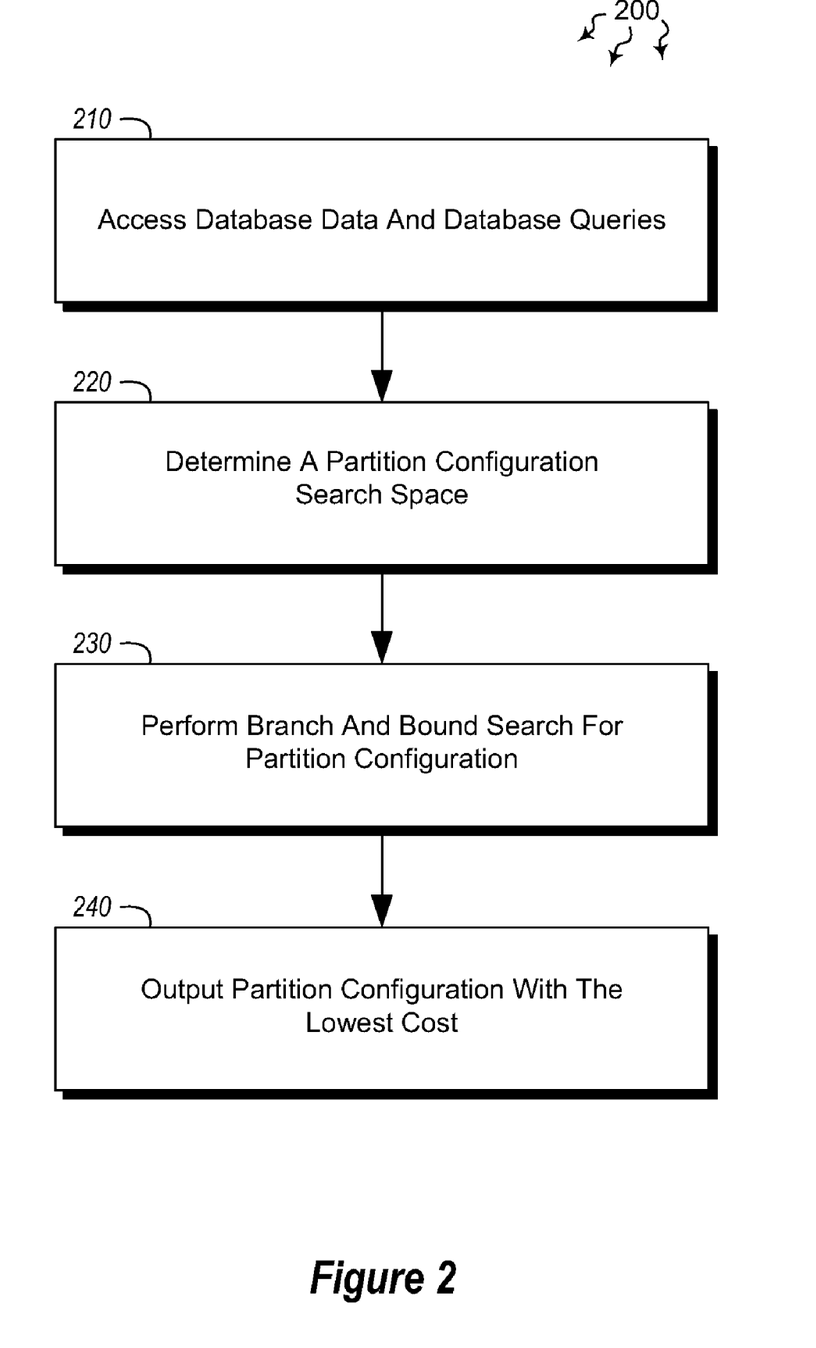
FIG. 2 illustrates a flowchart of an example method for determining optimal partition configurations for distributed database data using branch and bound search for best partition configuration.
Figure 3:
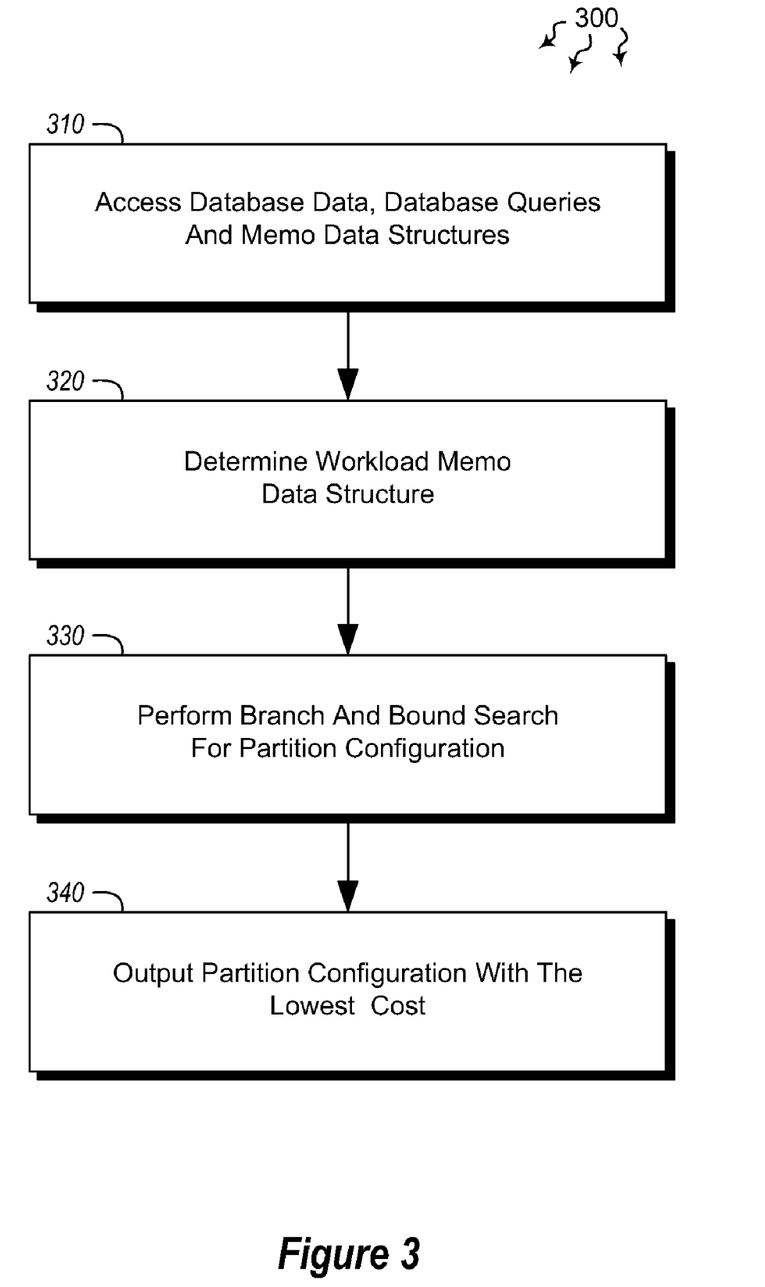
FIG. 3 illustrates a flowchart of an example method for implementing parallel query optimization memo data to improve partitioning cost simulation efficiency.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining optimal partition configurations for distributed database data. The method 200 will now be described with frequent reference to the components and data of environment 100.

Method 200 includes an act of accessing a portion of database data and one or more database queries for a given database (act 210). For example, search space determining module 115 may access database data 112 and database queries 113 which are directed to a given database. The queries may be received from user 105 or from another computer users, applications or computer systems. The database data may include various database tables with rows and columns of data. This data may be partitioned or replicated according to a partition configuration. This partition configuration may be part of a group of potential partition configurations that are in a given search space (e.g. search space 120).

Method 200 includes an act of determining, based on the accessed database data and database queries, a database search space which comprises a plurality of feasible partition configurations for the database data (act 220). For example, search space determining module 115 may determine, based on database data 112 and database queries 113, search space 120 which, as mentioned above, includes multiple different feasible partition configurations for data 112. In some cases, a parallel query optimizer may be used in conjunction with the database to simulate on a regular database the parallel execution of queries as if on a distributed database. Such simulations may include various "what-if" optimization scenarios. The results of these simulations may be stored and accessed at a later time.

Query optimizers may be configured to output memo data structures. These memo data structures may be used, along with various search policies 111, by the branch and bound search module 125. These memo data structures, among other things, may help prevent the branch and bound search from re-computing previously computed what-if optimizations and prevent the execution of steps that are irrelevant to obtaining the cost. The memo data structure may include all the necessary information to perform various "what-if" optimization scenarios, thus avoiding the re-generation of those scenarios whenever costs for new configuration need to be estimated.

Method 200 further includes an act of performing a branch and bound search in the partition configuration search space to determine which data partitioning path has the lowest cost, wherein the branch and bound search is performed according to one or more branch and bound search policies (act 230). For example, branch and bound search module 125 may be used to search in search space 120 to determine which data partitioning path or configuration has the lowest cost. The cost may be in terms of processing resources used, processing time, total disk space used for the partition configuration or other factors that would indicate that one partition configuration is better than another.

In some cases, the branch and bound search may include estimating a bound on values for an objective function that is obtained by growing a tree node to a given bound. The branch and bound search may prune various nodes from the tree when a node or the node's descendants are determined to be neither feasible nor optimal. Subtrees may also be pruned upon determining that a given subtree's nodes and the subtree's node's descendants are determined to be neither feasible nor optimal.

The branch and bound search may be conducted according to various search policies 111. The search policies may include a node selection policy that governs how to choose subsequent nodes for expansion. Using the node selection policy, the search picks, at each iteration, the node that should be expanded. Upon reaching a leaf node, the search backtracks to the earliest ancestor node that has not been fully traversed and begins traversing on that node.

The branch and bound policies may also include a table/column selection policy that ranks potential columns and tables based on their ability to be partitioned or replicated. Then, based on the ranking, the policy selects the top-ranked column or the table. Additional policies may include a node promotion policy that promotes bud nodes that fully specify an optimal partition configuration.

In addition to the various policies that may be implemented as a part of the branch and bound search, memo data structure from a query optimizer may also be implemented in the search. As explained above, the memo data structure may prevent the branch and bound search from re-computing the plan search space to be used for various what-if optimization scenarios of the queries in the workload. This may reduce the overall processing load for executing a branch and bound search for the best partition configuration. Moreover, in some cases, multiple individual memo data structures may be compressed into a single data structure, so that the individual search spaces for the individual memo data structures are combined into a global (workload) search space. This can help find best partitioning columns for the entire workload faster, reduce memory requirements and speed up the search.

The branch and bound search determines which particular key or column to distribute a given database table on for each portion of database data. The chosen key or column is typically a part of the lowest cost partition configuration, within the given constraints and policies, and based on the input data 112 and input queries 113. In some cases, the partition configuration may additionally be determined based on input from various leaf nodes in the partitioning solution tree. The state of one or more leaf nodes may be provided as an input to the branch and bound search to provide a global view of the existing constraints. In some cases, the branch and bound search may result in multiple partial partition configurations (i.e. *-partitions). From the various partial and full configurations, search module 125 may determine which data partitioning path has the lowest partitioning cost, based on the given constraints, policies, input data and queries.

Method 200 includes an act of outputting the partition configuration with the determined lowest cost (act 240). For example, branch and bound search module 125 may output lowest cost partition configuration 126 to a user (e.g. to a computer display of user 105), to a software application or to another computer system or group of computer systems.

Turning now to FIG. 3, FIG. 3 illustrates a flowchart of an alternative method 300 for implementing parallel query optimization memo data structure to improve partition configuration cost estimation efficiency using search policies. The method 300 will now be described with frequent reference to the components and data of environment 100.

Method 300 includes an act of accessing a portion of database data, one or more database queries for a given database and one or more memo data structures that include what-if optimization scenario computations (act 310). For example, search space determining module 115 may access database data 112, queries 113 for a given database, and memo data structures from a parallel query optimizer that include previously computed what-if optimization scenario computations. These memo data structures may be used to reduce the search space that indicates potential partition configurations and speed up their cost computations.

Method 300 includes an act of determining, based on the accessed database data, the database queries and the memo data structure, a search space which comprises a plurality of feasible partition configurations for the database data (act 320) and given workload of queries. For example, search space determining module 115 may determine, based on the database data 112, queries 113 and memo data structures, the partition configuration search space 120 that is to be searched for the lowest cost partition configuration. The search space includes both partial and full database partition configurations 121, where each database table is either replicated or partitioned on a particular column. Interesting columns may be selected for partitioning of tables, as explained above.

Method 300 also includes an act of performing a branch and bound search in the partition configuration search space to determine which partition configuration has the lowest cost, wherein the branch and bound search is performed according to one or more branch and bound search policies, and wherein the branch and bound search implements the memo data structures to avoid re-computing already calculated what-if optimization scenario computations (act 330). For example, branch and bound search module 125 may perform a branch and bound search in the partition configuration search space 120 to determine which data partitioning path has the lowest partitioning cost (e.g. configuration 126). The branch and bound search may be performed according to various branch and bound search policies (e.g. node selection policies, table/column selection policies, pruning policies, etc.). Moreover, the branch and bound search may implement the memo data structures to speed up partition configuration cost estimations by avoiding the re-computation of already calculated what-if scenario computations.

In some embodiments, the branch and bound search may include pruning nodes from a solutions tree when a node or the node's descendants are determined to be neither feasible nor optimal. The branch and bounds analysis may include navigating the search space to prune out the solutions that are guaranteed not to be better than configurations that have already been identified. The branch and bound policies may include a node selection policy that governs how to choose subsequent nodes for expansion, where the node selection policy includes selecting, at each iteration, the last node that was expanded and, upon reaching a leaf node, backtracking to the earliest ancestor node that has not been fully traversed and begin traversing on that node. Further policies may include a table-column selection policy that ranks potential columns and tables based on their ability to be partitioned or replicated, and selects the top-ranked column or table. A node promotion policy may also be implemented that promotes nodes that fully specify an optimal partition configuration.

Method 300 includes an act of outputting the partition configuration with the determined lowest partitioning cost (act 340). For example, branch and bound search module 125 may output to a user, computer system or software application, the partition configuration with the lowest cost. This cost may be in terms of various different factors, and may be affected by the input data, the queries, search policies and previously-computed simulations stored in memo data. The lowest cost partition configuration 126 allows a user or other application or computer system to select an optimal partition configuration, while avoiding re-calculation of previously calculated query optimizations scenarios.

Accordingly, methods, systems and computer program products are directed to determining optimal partition configurations for distributed database data. Alternative methods, systems and computer program products are also introduced for determining optimal partition configurations for distributed database data using internal memo data structures, search policies and other data to produce the lowest cost partition configuration.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for determining optimal partition configurations for distributed database data, the method comprising:
    an act of accessing a portion of database data and one or more database queries for a given database;
    an act of determining, based on the accessed database data and database queries, a partition configuration search space which comprises a plurality of feasible partition configurations for the database data;
    an act of performing a branch and bound search in the partition configuration search space to determine which data partitioning path has the lowest cost, wherein the branch and bound search is performed according to one or more branch and bound search policies, wherein one or more memo data structures from a parallel query optimizer are used in conjunction with the branch and bound search; and
    an act of outputting the partition configuration with the determined lowest cost.

2. The method of claim 1, wherein the branch and bound search comprises estimating a bound on values for an objective function that is obtained by growing a tree node to a given bound.

3. The method of claim 2, wherein the branch and bound search comprises pruning one or more nodes from the tree when a node or the node's descendants are determined to be either suboptimal or infeasible.

4. The method of claim 3, wherein one or more subtrees are pruned upon determining that a given subtree's nodes and the subtree's node's descendants are determined to be either suboptimal or infeasible.

5. The method of claim 1, wherein branch and bound policies include a node selection policy that governs how to choose subsequent nodes for expansion, the node selection policy comprising picking, at each iteration, the last node that was expanded and upon reaching a leaf node, backtracking to the earliest ancestor node that has not been fully traversed and begin traversing on that node.

6. The method of claim 1, wherein branch and bound policies include a table-column selection policy that ranks potential columns and tables based on their ability to be partitioned or replicated, and selects the top-ranked column for partitioning or replication scheme for a table.

7. The method of claim 1, wherein branch and bound policies include a node promotion policy that promotes nodes that fully specify an optimal or feasible partition configuration.

8. The method of claim 1, wherein the memo data structures prevent the branch and bound search from re-computing previously computed what-if optimization scenarios used for partition configurations' costs determinations.

9. The method of claim 1, wherein a plurality of individual memo data structures are compressed into a single data structure, such that the individual search spaces for the individual memo data structures are combined into a global workload search space.

10. The method of claim 1, wherein the branch and bound search determines which particular key or column to distribute a given database table on for each portion of database data.

11. The method of claim 10, wherein the branch and bound search results in a plurality of partial partition configurations.

12. The method of claim 1, wherein determining which data partitioning path has the lowest partitioning cost factors in one or more constraints.

13. The method of claim 1, wherein the cost of one or more leaf nodes representing full feasible configurations is provided as an input to the branch and bound search to provide a global cost constraint.

14. A computer program product for implementing a method for implementing parallel query optimization memo data to improve partition configurations' costs determinations efficiency, the computer program product comprising one or more computer-readable storage device having stored thereon computer-executable instructions that, when executed by one or more processors of the computing system, cause the computing system to perform the method, the method comprising:
  an act of accessing a portion of database data, one or more database queries for a given database and one or more generated memo data structures that include what-if optimization scenario computations;
  an act of determining, based on the accessed database data, the database queries and the memo data structures, a partition configuration search space which comprises a plurality of feasible partition configurations for the database data;
  an act of performing a branch and bound search in the partition configuration search space to determine which data partitioning path has the lowest cost, wherein the branch and bound search is performed according to one or more branch and bound search policies, and wherein the branch and bound search uses the memo data structures to avoid re-computing already calculated what-if optimization scenario computations, and further uses the memo data structures for partition configurations' cost determinations; and
  an act of outputting the partition configuration with the lowest determined cost.

15. The computer program product of claim 14, wherein the branch and bound search comprises pruning one or more nodes from the tree when a node or the node's descendants are determined to be either suboptimal or infeasible.

16. The computer program product of claim 14, wherein branch and bound policies include a node selection policy that governs how to choose subsequent nodes for expansion and includes a backtracking policy that governs where in the branch and bound tree the search is to move to when a leaf node is reached or a subtree is pruned, wherein the node selection policy comprises selecting, at each iteration, the last node that was expanded and continuing its expansion, the backtracking policy comprising navigating the search to either the earliest ancestor node that has not been fully traversed, or to the lowest cost bud node in the branch and bound tree that has not yet been fully explored, and initiating traversal on the determined earliest ancestor or lowest cost node.

17. The computer program product of claim 14, wherein branch and bound policies include a table-column selection policy that ranks potential columns and tables based on their ability to be partitioned or replicated, and selects the top-ranked column or table.

18. The computer program product of claim 14, wherein branch and bound policies include a node promotion policy that promotes nodes that fully specify a feasible partition configuration.

19. A computer system comprising the following:
  one or more processors;
  system memory; and
  one or more computer-readable storage media having stored thereon computer-executable instructions that, when executed by the one or more processors, causes the computing system to perform a method for determining optimal partition configurations for distributed database data, the method comprising the following:
    an act of accessing a portion of database data and one or more database queries for a given database;
    an act of determining, based on the accessed database data and database queries, a partition configuration search space which comprises a plurality of feasible partition configurations for the database data;
    an act of performing a branch and bound search in the partition configuration search space to determine which data partitioning configuration has the lowest determined cost, wherein the branch and bound search is performed according to one or more branch and bound search policies, wherein one or more memo data structures from a parallel query optimizer are used in conjunction with the branch and bound search; and
    an act of outputting the partition configuration with the lowest determined cost.

20. At a computer system including a processor and a memory, in a computer networking environment including a plurality of computing systems, a computer-implemented method for determining optimal partition configurations for distributed database data, the method comprising:
  an act of accessing a portion of database data and one or more database queries for a given database;
  an act of determining, based on the accessed database data and database queries, a partition configuration search space which comprises a plurality of feasible partition configurations for the database data;
  an act of performing a branch and bound search in the partition configuration search space to determine which data partitioning path has the lowest cost, wherein the branch and bound search is performed according to one or more branch and bound search policies, the branch and bound policies including a node selection policy that governs how to choose subsequent nodes for expansion, the node selection policy comprising picking, at each iteration, the last node that was expanded and upon reaching a leaf node, backtracking to the earliest ancestor node that has not been fully traversed and begin traversing on that node; and an act of outputting the partition configuration with the determined lowest cost.

21. A computer system comprising the following:

one or more processors;

system memory; and one or more computer-readable storage media having stored thereon computer-executable instructions that, when executed by the one or more processors, causes the computing system to perform a method for determining optimal partition configurations for distributed database data, the method comprising the following:

an act of accessing a portion of database data and one or more database queries for a given database;

an act of determining, based on the accessed database data and database queries, a partition configuration search space which comprises a plurality of feasible partition configurations for the database data;

an act of performing a branch and bound search in the partition configuration search space to determine which data partitioning path has the lowest cost, wherein the branch and bound search is performed according to one or more branch and bound search policies, the branch and bound policies including a node selection policy that governs how to choose subsequent nodes for expansion, the node selection policy comprising picking, at each iteration, the last node that was expanded and upon reaching a leaf node, backtracking to the earliest ancestor node that has not been fully traversed and begin traversing on that node; and an act of outputting the partition configuration with the determined lowest cost.

\* \* \* \* \*